(12) United States Patent
Brundage et al.

(10) Patent No.: US 7,547,334 B2
(45) Date of Patent: Jun. 16, 2009

(54) CONTINUOUS REACTOR

(75) Inventors: Mark A. Brundage, Pittsford, NY (US); Edward J. Bissett, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 763 days.

(21) Appl. No.: 10/768,622

(22) Filed: Jan. 30, 2004

(65) Prior Publication Data

US 2005/0166456 A1 Aug. 4, 2005

(51) Int. Cl.
- *C01B 3/36* (2006.01)
- *C10J 3/46* (2006.01)
- *C10J 3/54* (2006.01)
- *B01J 7/00* (2006.01)
- *H01M 8/06* (2006.01)
- *B01J 7/02* (2006.01)

(52) U.S. Cl. ............... 48/197 R; 48/61; 422/239
(58) Field of Classification Search .......... 422/198, 422/239; 48/198.3
See application file for complete search history.

(56) References Cited

U.S. PATENT DOCUMENTS

| | | | | |
|---|---|---|---|---|
| 4,827,071 A * | 5/1989 | Hazbun | ................ | 585/443 |
| 5,006,494 A * | 4/1991 | Virkar | ................ | 501/152 |
| 5,160,618 A * | 11/1992 | Burggraaf et al. | ........... | 210/490 |
| 5,723,035 A * | 3/1998 | Mazanec et al. | ............ | 204/295 |
| 6,002,106 A * | 12/1999 | Kataoka et al. | ............. | 219/216 |
| 6,162,558 A * | 12/2000 | Borup et al. | .................. | 429/19 |
| 6,201,945 B1 * | 3/2001 | Schlueter et al. | ............ | 399/329 |
| 6,223,843 B1 * | 5/2001 | O'Connell et al. | ......... | 180/65.3 |
| 6,254,848 B1 * | 7/2001 | Autenrieth et al. | ........ | 423/648.1 |
| 6,290,913 B1 * | 9/2001 | Aoyama | .................... | 422/110 |
| 6,340,433 B1 * | 1/2002 | Kuznicki et al. | ............ | 210/651 |
| 2004/0018134 A1 * | 1/2004 | Liu et al. | .................... | 423/247 |

FOREIGN PATENT DOCUMENTS

JP 2003346859 A * 12/2003

* cited by examiner

*Primary Examiner*—Alexa D Neckel
*Assistant Examiner*—Matthew J Merkling
(74) *Attorney, Agent, or Firm*—Dinsmore & Shohl LLP

(57) ABSTRACT

Reactors and methods for reducing the carbon monoxide concentration in a reactant stream are provided. The reactors are generally configured such that a reactant from a second reactant stream may be continuously introduced along at least a portion of the length of a first reactant stream. A membrane may separate a first reactant stream and a second reactant stream.

16 Claims, 3 Drawing Sheets

CONTINUOUS REACTOR

BACKGROUND OF THE INVENTION

The present invention relates to reactors and methods for catalyzing a reaction. More particularly, the present invention relates to reactors having first and second reactant flow paths configured to enable a reactant from the second reactant flow path to be continuously introduced to at least a portion of the first reactant flow path. The reactors and methods may be used to remove carbon monoxide from a reactant stream.

Hydrogen fuel cells have become an increasingly attractive source of power for a variety of applications. However, the storage, transportation, and delivery of hydrogen present a number of difficulties. Thus, hydrogen fuel cell systems may be equipped with reforming systems for producing hydrogen from an alternate fuel source such as a hydrocarbon fuel. However, these reforming systems often require extensive carbon monoxide removal subsystems because hydrogen fuel cells are generally not tolerant of carbon monoxide. The carbon monoxide removal systems may not efficiently remove a desired amount of carbon monoxide.

Thus, there remains a need in the art for carbon monoxide clean-up subsystems that are more efficient.

SUMMARY OF THE INVENTION

In accordance with an embodiment of the present invention, a device comprising a reactor defined by at least one first reactant flow path is provided. The at least one first reactant flow path comprises a length. The reactor comprises at least one second reactant flow path proximate to the at least one first reactant flow path, and the reactor further comprises at least one catalyst disposed along the at least one first reactant flow path. The at least one first reactant flow path is configured to enable a first reactant stream to flow along the length of the at least one first reactant flow path from a beginning of the length of the at least one first reactant flow path to an end of the length of the at least one first reactant flow path. The at least one first reactant flow path is configured to enable the first reactant stream to contact the catalyst, and the at least one second reactant flow path is configured to enable a second reactant stream to flow proximate to the first reactant stream along at least a portion of the length of the at least one first reactant flow path from the beginning of the length of the at least one first reactant flow path to the end of the length of the at least one first reactant flow path. The at least one second reactant flow path is configured to enable a second reactant from the second reactant stream to be continuously introduced to the at least one first reactant flow path along at least a portion of the length of the at least one first reactant flow path.

In accordance with another embodiment of the present invention, a device comprising a preferential oxidation reactor defining at least one channel, at least one first reactant flow path, and at least one second reactant flow path is provided. The first reactant flow path comprises hydrogen and carbon monoxide, and the second reactant flow path comprises oxygen. The at least one channel comprises a length, an inlet, and an outlet, and the at least one first reactant flow path extends along the length between the channel inlet and the channel outlet. The at least one channel comprises a catalyst selected to alter a rate of reaction of carbon monoxide and oxygen, and the at least one channel is configured such that at least a portion of the at least one second reactant flow path is placed in communication with at least a portion of the at least one first reactant flow path via a partition. The partition is configured to define a substantially continuous introduction of the oxygen to the first reactant flow path along at least a portion of the length of the at least one channel.

In accordance with yet another embodiment of the present invention, a method for removing carbon monoxide from a reactant stream is provided. The method comprises: providing at least one first reactant flow path comprising a length; providing at least one catalyst along the at least one first reactant flow path; providing at least one second reactant flow path proximate to the at least one first reactant flow path; flowing a first reactant stream comprising carbon monoxide and hydrogen along the at least one first reactant flow path from a beginning of the length to an end of the length; and flowing a second reactant stream along the at least one second reactant flow path. The first reactant stream is defined by a carbon monoxide concentration, and the first reactant stream contacts the catalyst. The second reactant stream comprises oxygen, and the at least one second reactant flow path is configured such that the oxygen from the second reactant stream is continuously introduced to at least a portion of the at least one first reactant flow path along the length of the at least one first reactant flow path. The carbon monoxide concentration of the first reactant stream is reduced between the beginning of the length of the at least one first reactant flow path to the end of the length of the at least one first reactant flow path.

In accordance with another embodiment of the present invention, a device comprising a reactor defined by at least one channel is provided. The at least one channel comprises a length, an inlet, and an outlet, and the reactor comprises at least one first reactant flow path along the at least one channel between the inlet and the outlet. The reactor comprises at least one second reactant flow path proximate to the at least one channel, and at least a portion of the at least one first reactant flow path and at least a portion of the at least one second reactant flow path are separated by an oxygen porous membrane. The oxygen porous membrane is selected from yttria stabilized bismuth oxide, silver, ETS-4 zeolite material, SOFC electrolyte material, and polyimide and $TiO_2$/polyimide composite and combinations thereof. The reactor further comprises at least one preferential oxidation catalyst disposed along the at least one channel. The at least one first reactant flow path is configured to enable a first reactant stream to flow along the length of the at least one channel from the inlet to the outlet, and the at least one first reactant flow path is configured to enable the first reactant stream to contact the preferential oxidation catalyst. The at least one second reactant flow path is configured to enable a second reactant stream comprising oxygen to flow proximate to the channel along the length of the reactor from the inlet to the outlet, and the at least one second reactant flow path is configured to enable the oxygen from the second reactant flow stream to permeate the membrane and be continuously introduced to at least a portion of the at least one first reactant flow path along the length of the channel from the inlet to the outlet.

BRIEF DESCRIPTION OF THE DRAWINGS

The following detailed description of the preferred embodiments of the present invention can be best understood when read in conjunction with the following drawings, where like structure is indicated with like reference numerals and in which.

DESCRIPTION OF THE PREFERRED EMBODIMENT

Figure 1:
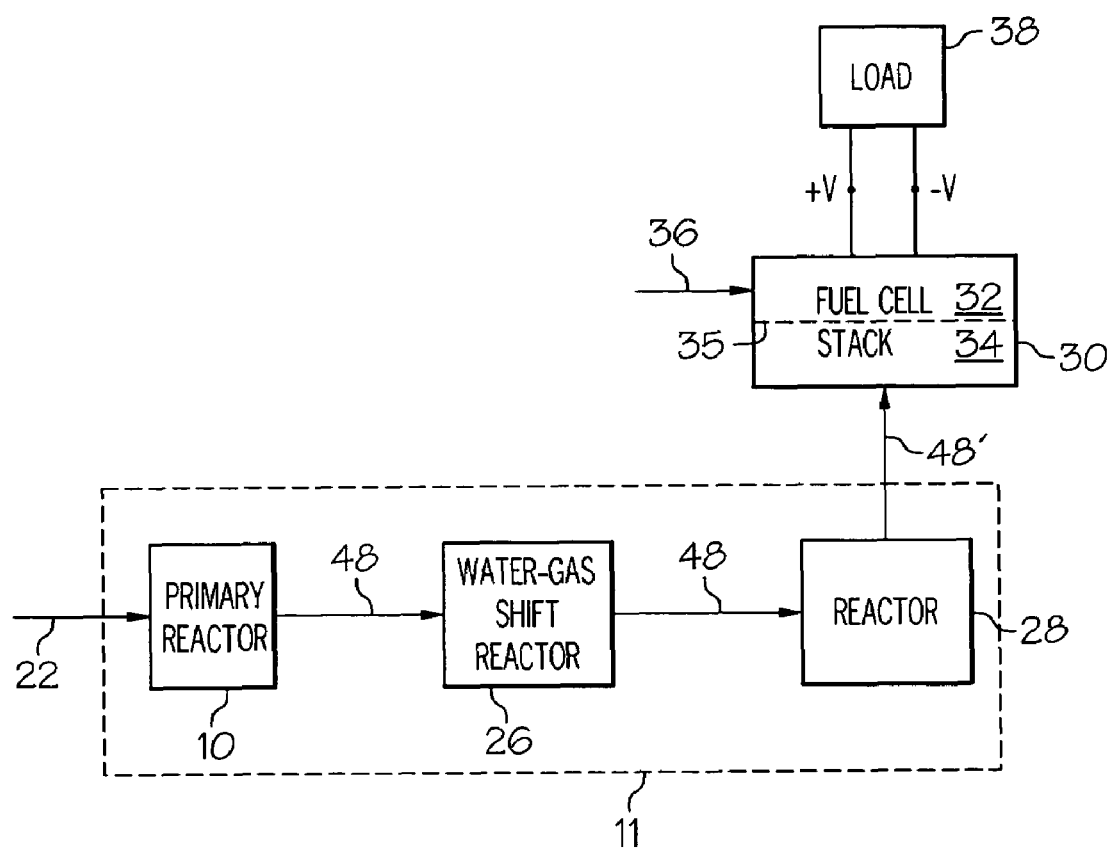
FIG. 1 is schematic illustration of a fuel cell system in accordance with the present invention.

FIG. 1 illustrates an exemplary fuel cell system comprising a fuel processing system 11 with a primary reactor 10, a water-gas shift reactor 26, and a preferential oxidation reactor 28. The fuel processing system 11 provides the fuel cell stack 30 with a source of hydrogen. In the primary reactor 10, a reactant mixture 22 that may contain a hydrocarbon fuel stream and an oxygen-containing stream is flowed into the primary reactor 10. The oxygen-containing stream may comprise air, steam, and combinations thereof. The reactant mixture 22 may be formed by mixing a hydrocarbon fuel with a preheated air and steam input stream before flowing the reactant mixture into the primary reactor. After the reactant mixture 22 enters the primary reactor 10, the reactant mixture 22 passes over at least one catalytic reaction zone. The primary reactor 10 is generally an autothermal reactor in which hydrogen is produced by combined catalytic partial oxidation and steam reforming reactions, but may alternatively comprise any suitable reactor configuration.

In one embodiment, the reactant gas stream 48 exiting the primary reactor 10 comprises hydrogen and carbon monoxide. The reactant gas stream 48 exiting the primary reactor 10 may further comprise carbon dioxide, water in the form of steam, nitrogen (from air), and other trace compounds. To reduce the carbon monoxide and to increase hydrogen concentration, the reactant gas stream 48 may enter a water gas-shift reactor 26. Oxygen from existing or added water converts the carbon monoxide to carbon dioxide leaving additional hydrogen by the following reaction: $CO + H_2O \leftrightarrow H_2 + CO_2$. However, the water-gas-shift reactor may not reduce the carbon monoxide low enough for efficient stack operation. The further reduction of carbon monoxide to acceptable concentration levels takes place in reactor 28. Reactor 28 may be a preferential oxidation reactor. The preferential oxidation reactor 28 will be discussed further in detail hereinafter.

The carbon monoxide cleansed product stream 48' exiting the reactor 28 is then fed into a fuel cell stack 30. As used herein, the term fuel cell stack refers to one or more fuel cells to form an electrochemical energy converter. As is illustrated schematically in FIG. 1, the electrochemical energy converter may have an anode side 34 and a cathode side 32 separated by diffusion barrier layer 35. The carbon monoxide cleansed product stream 48' is fed into the anode side 34 of the fuel cell stack 30. An oxidant stream 36 is fed into the cathode side 32. The hydrogen from the carbon monoxide cleansed product stream 48' and the oxygen from the oxidant stream 36 react in the fuel cell stack 30 to produce electricity for powering a load 38. A variety of alternative fuel cell designs are contemplated by the present invention including designs that include a plurality of anodes 34, a plurality of cathodes 32, or any fuel cell configuration where hydrogen is utilized in the production of electricity.

Figure 2:
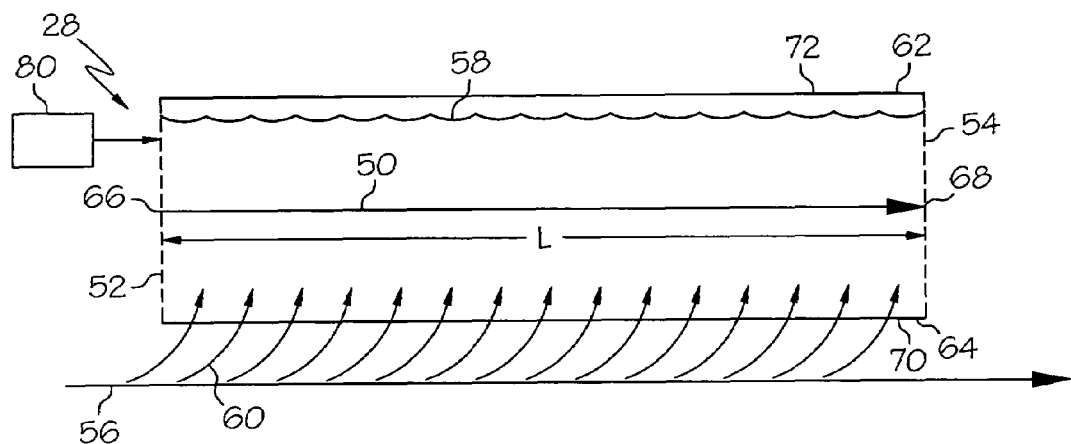
FIG. 2 is a schematic illustration of a reactor in accordance with an embodiment of the present invention.
Figure 3:
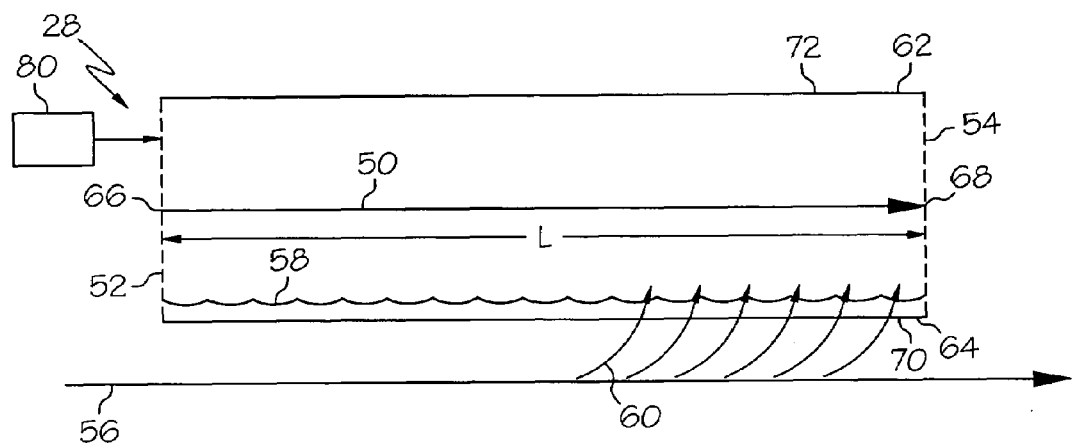
FIG. 3 is a schematic illustration of a reactor in accordance with another embodiment of the present invention.

Referring to FIGS. 2 and 3, a device comprising a reactor 28 is provided. A first reactant flow path 50 defines the reactor 28. The first reactant flow path 50 comprises a length L. The first reactant flow path 50 may extend along a channel 62 which may comprise a length L, an inlet 52, and an outlet 54. Although the first reactant flow path 50 is illustrated as a single line between the inlet 52 and the outlet 54 of the channel 62, it will be understood that the first reactant flow path 50 may extend along the length L of the channel 62 to take up the available volume of the channel 62. For purposes of defining and describing the present invention, "channel" will be understood as referring to any suitable structure of any suitable shape having at least one inlet and at least one outlet.

The first reactant flow path 50 is configured to enable a first reactant stream (not shown) to flow along the length of the first reactant flow path 50 from a beginning 66 of the length L of the first reactant flow path 50 to an end 68 of the length L of the first reactant flow path 50. The first reactant flow path 50 may extend along the length L of the channel 62 between the channel inlet 52 and the channel outlet 54. Although the first reactant flow path 50 and the channel 62 are illustrated as being linear, it will be understood that the first reactant flow path 50 and the channel 62 may have any suitable shape including but not limited to, curved, spiral, and an irregular shape.

The reactor has at least one catalyst 58 disposed along the first reactant flow path. The catalyst 58 is selected to alter a rate of reaction of first and second reactants. In accordance with one embodiment, the catalyst 58 may comprise a preferential oxidation catalyst selected to alter the reaction rates of a first reactant, carbon monoxide, with a second reactant, oxygen. The preferential oxidation catalyst may be any suitable preferential oxidation catalyst. For example, the preferential oxidation catalyst may be selected from platinum, platinum alloys, noble metal catalysts, promoted noble metal catalysts, Au, promoted Au, and combinations thereof. The reactant flow path 50 is configured to enable the first reactant stream to contact the catalyst 58.

The reactor 28 comprises a second reactant flow path 56, which may be proximate to the first reactant flow path 50. The second reactant flow path 56 may be configured to enable a second reactant stream (not shown) to flow proximate to the first reactant stream along the length L of the first reactant flow path 50. The second reactant flow path 56 is configured to enable a second reactant 60 from the second reactant stream to be continuously introduced to the first reactant flow path 50 along at least a portion of the length L of the first reactant flow path 50. It will be understood that "continuously introduced" refers to the second reactant being continuously available to the first reactant flow path along a point upstream to a point downstream along at least a portion of the length L of the first reactant flow path. The reactor 28 may have an additional source 80 of the second reactant configured to enable the second reactant from the additional source 80 to be discretely introduced to a portion of the first reactant flow path proximate to the beginning 66 of the first reactant flow path 50. It will be understood that "discretely introduced" refers to the second reactant being introduced in a one-time addition at a single point along the length L of the first reactant flow path 50.

In accordance with an embodiment of the present invention, the first reactant stream may comprise hydrogen and carbon monoxide, and the first reactant stream may be defined by a carbon dioxide concentration. The second reactant stream may comprise air or a modified air stream, and the second reactant 60 may comprise oxygen. Thus, oxygen may be continuously introduced to the first reactant flow path 50 along at least a portion of the length L of the first reactant flow path 50. Additionally, oxygen 60 may be discretely introduced to the first reactant flow path 50 proximate to the beginning 66 of the first reactant flow path 50.

A preferential oxidation reaction of the carbon monoxide in the first reactant stream generally occurs in the reactor 28 when the first reactant stream contacts the preferential oxidation catalyst 58 and oxygen 60 from the second reactant stream is continuously introduced or oxygen from the additional source 80 is discretely introduced.

Three reactions generally occur in the reactor 28. The first reaction is carbon monoxide oxidation: $CO+\frac{1}{2}O_2 \rightarrow CO_2$. This reaction removes carbon monoxide and is desirable. Thus, the concentration of carbon monoxide in the first reactant stream is reduced as the first reactant stream flows along the first reactant flow path 50 between the beginning 66 of the length L of the first reactant flow path 50 and the end 68 of the length L of the first reactant flow path 50.

The second reaction is hydrogen oxidation: $H_2+\frac{1}{2}O_2 \rightarrow H_2O$. This reaction depletes hydrogen, which is needed in the fuel cell stack 30. Thus, it is important not to have too much oxygen present to limit hydrogen oxidation. The third reaction is the reverse-water-gas shift reaction: $CO_2+H_2 \rightarrow H_2O+CO$, which cannibalizes hydrogen to produce undesirable carbon monoxide. The reverse-water-gas shift reaction is a slow reaction as compared to carbon monoxide and hydrogen oxidation, but the carbon monoxide production can be significant in the absence of oxygen when oxidation of carbon monoxide is not possible.

Thus, it is desirable to maintain a suitable level of oxygen 60 throughout the preferential oxidation reactor 28 so that the effect of the reverse-water-gas shift reaction is kept to a minimum. Additionally, it is desirable to limit excess oxygen 60 in the reactor 28 because excess oxygen will promote the consumption of hydrogen. Therefore, along the length L of a channel 62 of a preferential oxidation reactor 28 an appropriate amount of oxygen 60 is desired to achieve maximum efficiency. It will be understood that the appropriate amount of oxygen 60 may vary depending on the reactor 28 conditions.

Referring to FIG. 2, in accordance with an embodiment of the present invention, the second reactant flow path 56 is configured to enable the second reactant 60 to be continuously introduced to the first reactant flow path 50 along the entire length L of the first reactant flow path 50 from the beginning 66 to the end 68. Additionally, a supplemental source 80 of the second reactant 60 may be configured to enable the second reactant 60 from the additional source 80 to be discretely introduced to a portion of the first reactant flow path 50 proximate to the beginning 66.

Referring to FIG. 3, in accordance with an embodiment of the present invention the second reactant flow path 56 is configured to enable the second reactant 60 to be continuously introduced to a portion of the first reactant flow path 50 downstream from the beginning 66 of the length L of the first reactant flow path 50. It will be understood that the second reactant flow path 56 may be configured to enable the second reactant 60 to be continuously introduced to any desired portion of the first reactant flow path 50 downstream from the beginning 66 of the length L. For example, the second reactant 60 may be continuously introduced from the middle of the first reactant flow path 50 to the end 68 of the first reactant flow path 50 as illustrated. Alternatively, the second reactant 60 could be continuously introduced from before the middle of the first reactant flow path 50 to the end 68.

The second reactant 60 from the second reactant stream may be continuously introduced to the first reactant flow path 50 in any suitable manner. In accordance with an embodiment of the present invention, the channel 62 may be configured such that at least a portion of the second reactant flow path 56 is placed in communication with at least a portion of the first reactant flow path 50 via a partition 64. The partition 64 is configured to define a substantially continuous introduction of a second reactant 60 from the second reactant stream along at least a portion of the length L of the channel 62. For example, the partition may be configured to define a substantially continuous introduction of a second reactant 60 from the second reactant stream along only a portion of the length L of the channel 62 or along substantially the entire length L of the channel 62. The partition 64 may be configured to define a substantially continuous introduction of the second reactant 60 along a portion of the length L of the channel 64 downstream from the inlet 52 as illustrated in FIG. 3.

The partition 64 may comprise a porous membrane, and the porous membrane may be an oxygen porous membrane. The oxygen porous membrane may be any suitable membrane. For example, the membrane may be made from yttria stabilized bismuth oxide or silver. The membrane may be made from ETS-4 zeolite materials as detailed in U.S. Pat. No. 4,938,939, which is incorporated by reference herein. The membrane may be made from solid oxide fuel cell (SOFC) electrolyte materials. Suitable SOFC electrolyte materials include, but are not limited to: $CeO_2$ doped with $Mg^{2+}$, $Ca^{2+}$, $Sr^{2+}$, $Yb^{3+}$, $Y^{3+}$, $Gd^{3+}$, $La^{3+}$, $Ti^{4+}$, $Zr^{4+}$, $Nb^{5+}$, $Sc^{+3}$, $Sm^{3+}$; Zr doped with Ca, Y, yttria-stabilized zirconia (YSZ); perovskite-type $La_{1-x}A_xCO_{1-y}B_yO_{3-d}$ where A=Sr, Ba, Ca; B=Fe, Cu, Ni; d is the non-shoichiometery factor and is often between 0 and 0.3; $La_{0.85}Sr_{0.15}MnO_3$; and perovskite-type $ABO_3$ where A=La, Sr, Ca; B=Co, Fe. The membrane may alternatively be made from a polyimide and $TiO_2$/polyimide composite.

Thus, when the partition 64 comprises an oxygen porous membrane, oxygen 60 from the second reactant stream may migrate through the oxygen porous membrane along at least a portion of the length L of the first reactant flow path 50, and oxygen 60 from the second reactant stream may be available along a portion of the length L of the first reactant flow path 50 along which a preferential oxidation reaction may take place. It will be understood that the amount of oxygen that diffuses through the porous membrane may vary with varying reaction conditions. For example, the rate of migration may change based on the amount of carbon monoxide and hydrogen in the first reactant stream, the temperature of the reactor 28, and depending on which catalyst 58 is selected. Thus, a membrane or membranes may be selected that will allow the best rate of oxygen migration based on a given set of reaction conditions, and the degree of porosity of the membrane may be selected such that an optimized amount of oxygen 60 from the second reactant stream is continuously introduced to at least a portion of the first reactant flow path 50.

The channel 62 may have at least a first sidewall 70 and at least a second sidewall 72, and the first sidewall 70 may comprise the partition 64 which may be an oxygen porous membrane. The channel 62 may further have a third sidewall and a fourth sidewall (not shown), and the sidewalls may comprise partitions 64. It will be understood that channel 62 may be configured in any suitable manner and that a plurality of channels 62 may be employed as desired. The catalyst 58 may be disposed on the first sidewall 70 as illustrated in FIG. 3, and oxygen may diffuse through the oxygen porous membrane to the surface of the catalyst 58 such that a preferential oxidation reaction may occur as discussed herein. The second sidewall 72 may be a non-reactive wall such as a heat exchanger wall. Alternatively, the catalyst 58 may be disposed on the second sidewall 72 as illustrated in FIG. 2.

Figure 4:
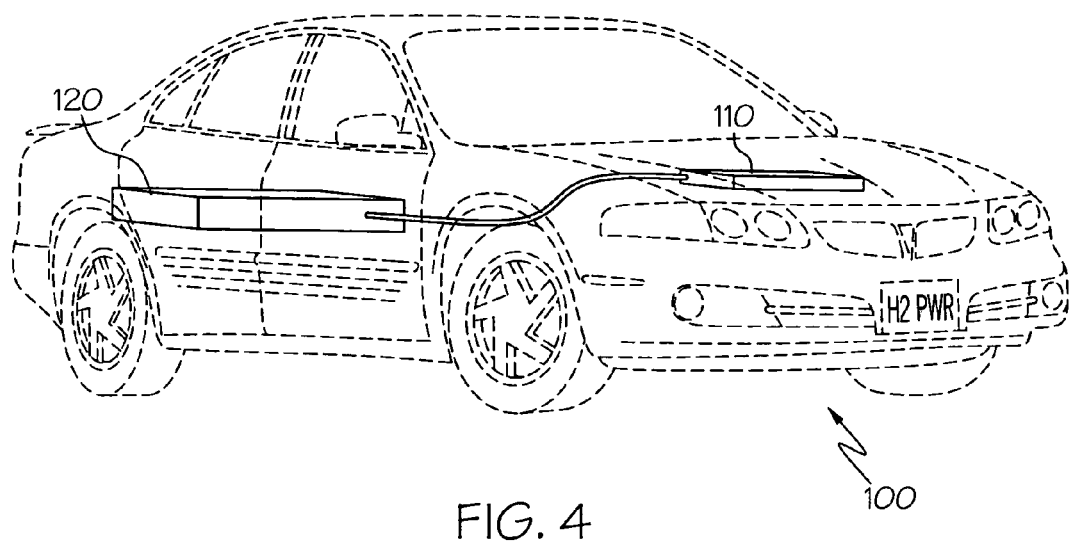
FIG. 4 is a schematic illustration of a vehicle having a fuel processing system and an electrochemical reaction cell in accordance with the present invention.

Referring to FIG. 4, the present invention may further comprise a vehicle body 100 and an electrochemical catalytic reaction cell comprising a fuel cell 110. The fuel cell 110 may be configured to at least partially provide the vehicle body with motive power. The vehicle 100 may also have a fuel processing system 120 to supply the fuel cell 110 with hydrogen, and the fuel processing system may include a reactor 28 and a primary reactor 10 as discussed herein. It will be understood by those having skill in the art that fuel cell 110 and fuel processing system 120 are shown schematically and may be used or placed in any suitable manner within the vehicle body 100.

Unless otherwise indicated, all numbers expressing quantities, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention.

It will be obvious to those skilled in the art that various changes may be made without departing from the scope of the invention, which is not to be considered limited to what is described in the specification.

The invention claimed is:

1. A method for removing carbon monoxide from a reactant stream, the method comprising:
    configuring a reactor to comprise:
        a first flow path defining a length and a preferential oxidation catalyst disposed therealong, said first flow path configured to convey carbon monoxide and hydrogen contained in said reactant stream;
        a second flow path configured to convey an oxygen-containing fluid stream; and
        an oxygen-porous membrane disposed between said first and second flow paths;
    flowing said reactant stream along said first flow path such that at least said carbon monoxide contained therein contacts said preferential oxidation catalyst; and
    variably flowing oxygen to said first flow path in order to promote a preferential oxidation reaction between said oxygen and said carbon monoxide that is in contact with said preferential oxidation catalyst, said variably flowing of said oxygen comprising:
        continuously flowing oxygen contained in said second flow path along at least a portion of said length of said first flow path such that said continuously flowing oxygen passes across said membrane and to said carbon monoxide that is in contact with said preferential oxidation catalyst; and
        discretely flowing oxygen into an upstream portion of said first flow path in such quantity that catalytic reaction with said carbon monoxide that is in contact with said preferential oxidation catalyst occurs while inhibiting in said first flow path both the consumption of hydrogen in said reactant stream and the formation of a reverse water gas shift reaction in said reactant stream, a combination of said continuously flowing and said discretely flowing configured to avoid an even distribution of oxygen throughout said first flow path.

2. The method as claimed in claim 1 wherein said continuously flowing oxygen is first introduced downstream from a beginning of said first flow path.

3. The method as claimed in claim 1 wherein said preferential oxidation catalyst is selected to preferentially oxidize carbon monoxide over hydrogen.

4. The method as claimed in claim 1 wherein said oxygen-porous membrane separates said first and second flow paths from a beginning of said length to said end of said length.

5. The method as claimed in claim 1 wherein said first and second flow paths are fluidly separated from one another along said length of said first reactant flow path at least up to where said oxygen-porous membrane is present.

6. The method as claimed in claim 1 wherein said first flow path defines an elongate channel that comprises at least a first sidewall and a second sidewall such that said first sidewall comprises said membrane.

7. The method as claimed in claim 6 wherein said second sidewall comprises a heat exchanger wall.

8. The method as claimed in claim 6 wherein said preferential oxidation catalyst is disposed on said first sidewall.

9. The method as claimed in claim 6 wherein said preferential oxidation catalyst is disposed on said second sidewall.

10. The method as claimed in claim 1 wherein said membrane comprises yttria stabilized bismuth oxide.

11. The method as claimed in claim 1 wherein said membrane comprises silver.

12. The method as claimed in claim 1 wherein said membrane comprises ETS-4 zeolite material.

13. The method as claimed in claim 1 wherein said membrane comprises SOFC electrolyte material.

14. The method as claimed in claim 13 wherein said SOFC electrolyte material is selected from $CeO_2$ doped with $Mg^{2+}$, $Ca^{2+}$, $Sr^{2+}$, $Yb^{3+}$, $Y^{3+}$, $Gd^{3+}$, $La^{3+}$, $Ti^{4+}$, $Zr^{4+}$, $Nb^{5+}$, $Sc^{3+}$, $Sm^{3+}$; Zr doped with Ca, Y, yttria-stabalized zirconia (YSZ); perovskite-type $La_{1-x}A_xCo_{1-y}B_yO_{3-d}$ where A=Sr, Ba, Ca, B=Fe, Cu, Ni, and d is the non-stoichiometery factor; $La_{0.85}Sr_{0.15}MnO_3$; and perovskite-type $ABO_3$ where A=La, Sr, Ca, B=Co, Fe; and combinations thereof.

15. The method as claimed in claim 1 wherein said membrane comprises a $TiO_2$/polyimide composite.

16. The method as claimed in claim 1 wherein said second flow path is configured such that oxygen from said second flow path is continuously introduced only to a portion of said first flow path proximate to an end of said length.

* * * * *

UNITED STATES PATENT AND TRADEMARK OFFICE
CERTIFICATE OF CORRECTION

PATENT NO. : 7,547,334 B2
APPLICATION NO. : 10/768622
DATED : June 16, 2009
INVENTOR(S) : Brundage et al.

It is certified that error appears in the above-identified patent and that said Letters Patent is hereby corrected as shown below:

Col. 8, Line 39, "$Sc^{3+}$" should read --$Sc^{+3}$--

Signed and Sealed this

Third Day of November, 2009

David J. Kappos
*Director of the United States Patent and Trademark Office*